(No Model.)

C. HAHN.
NUT LOCK.

No. 532,274. Patented Jan. 8, 1895.

WITNESSES:
Joshua Bengstrom
Theo. G. Hoster

INVENTOR
C. Hahn

BY
Munn & Co.
ATTORNEYS.

THE NORRIS PETERS CO., PHOTO-LITHO., WASHINGTON, D. C.

UNITED STATES PATENT OFFICE.

CONRAD HAHN, OF PITTSBURG, PENNSYLVANIA.

NUT-LOCK.

SPECIFICATION forming part of Letters Patent No. 532,274, dated January 8, 1895.

Application filed June 13, 1894. Serial No. 514,401. (No model.)

*To all whom it may concern:*

Be it known that I, CONRAD HAHN, of Pittsburg, in the county of Allegheny and State of Pennsylvania, have invented a new and Improved Nut-Lock, of which the following is a full, clear, and exact description.

The object of the invention is to provide a new and improved nut lock, which is comparatively simple and durable in construction, easily applied, and arranged to positively lock the nut or nuts in place on rail joints or other devices.

The invention consists principally of a plate adapted to be supported from the bolts, and a bar held on the said plate and adapted to engage the nut on the bolt to prevent the nut from turning.

The invention also consists in certain parts and details, and combinations of the same, as will be hereinafter fully described and then pointed out in the claims.

Reference is to be had to the accompanying drawings, forming a part of this specification, in which similar letters of reference indicate corresponding parts in all the views.

Figure 1:
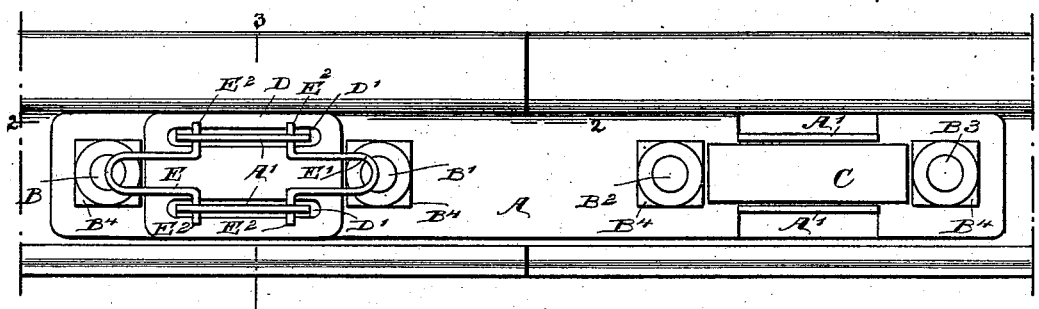
Figure 2:
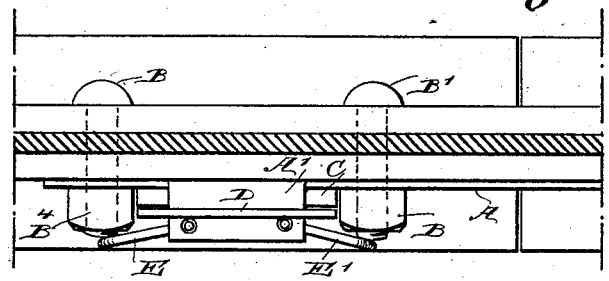
Figure 3:
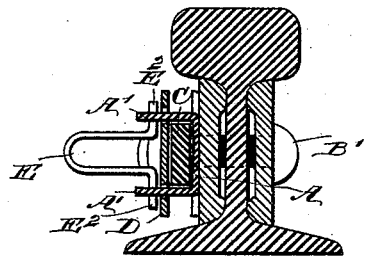
Figure 4:
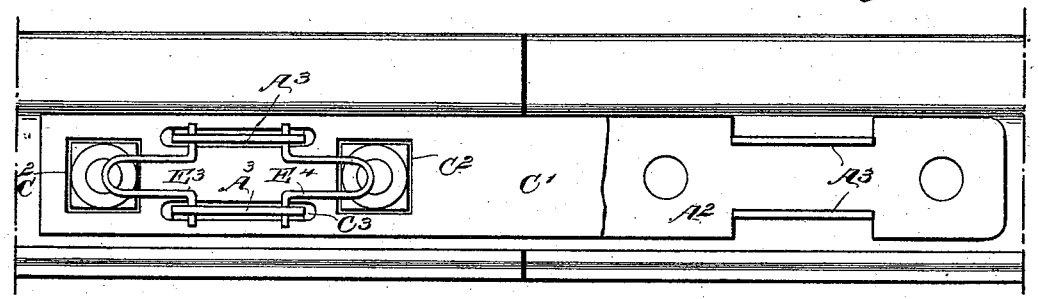
Figure 5:
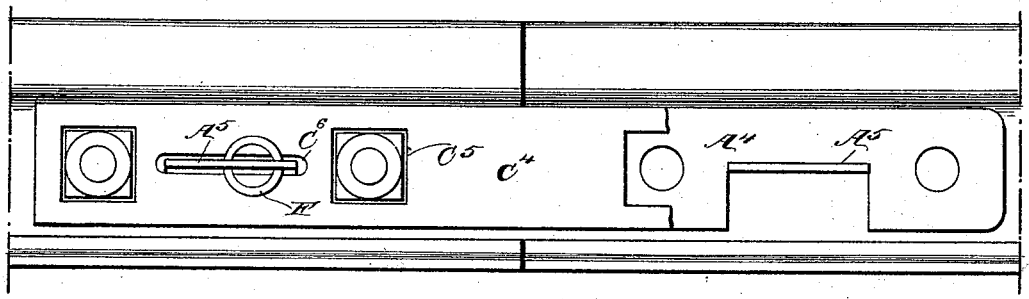

Figure 1 is a side elevation of the improvement as applied on a rail joint. Fig. 2 is a sectional plan view of the same, on the line 2—2 of Fig. 1. Fig. 3 is a transverse section of the same, on the line 3—3 of Fig. 1. Fig. 4 is a side elevation of a modified form of the improvement, with parts broken out; and Fig. 5 is a similar view of another modified form of the improvement.

The improved nut-lock is provided with a plate A, formed with apertures for the passage of the bolts B, B', B², B³, the nuts B⁴ of which are intended to be locked securely in place. As illustrated in the drawings, the plate A is held on the bolts next to the fish plate, and is formed with two longitudinally extending offsets A', projecting forwardly to form a resting place for a bar C, of a length corresponding to the distance between two adjacent nuts B⁴, so that when the said bar C is held on the offsets A', it engages the opposite sides of the two adjacent nuts, so as to lock the same in place.

In order to hold the bar C in position on the plate A, various devices may be employed, but I prefer the construction shown in Figs. 1, 2 and 3, in which a locking plate D is employed, formed with longitudinal slots D' fitting over the offsets A', the said locking plate resting against the bar C, as plainly shown in the drawings. The locking plate D is fastened in position by keys E E', made U-shape and having their ends formed with angular lugs E², engaging apertures in the offsets A', so that when the said keys are sprung in place by their lugs engaging the said apertures, then the locking plate D is held in position and the bar C is securely locked in position.

As shown in Fig. 4, the locking plate D is entirely dispensed with, and the bar C' is formed with recesses C² engaging all the sides of the nuts to be locked in position, the said bar C' being formed with longitudinally extending slots C³, through which pass the offsets A³ of the plate A². The keys E³, E⁴ engage apertures in the said offsets A³, so as to lock the bar C' directly in place, to prevent turning of the nuts.

As shown in Fig. 5, the plate A⁴ is provided with but the single offset A⁵, located between adjacent bolts, and this offset extends through a slot C⁶ arranged in a bar C⁴ formed with apertures C⁵, engaging the sides of the nuts, to lock the latter in place. A key F is passed through an aperture in the offset A⁵, so as to lock the plate C⁴ in position.

It will be seen that this nut-lock is very simple and durable in construction, can be readily applied, and does not require any change whatever in the form of construction of the bolts, fish plates and other devices on which the nut-lock is applied.

Having thus described my invention, I claim as new and desire to secure by Letters Patent—

1. A nut-lock comprising a plate having bolt apertures and provided with parallel flanges having apertures, a nut engaging plate or bar having parallel slots receiving the flanges and the spring keys having their ends bent oppositely to enter the said flange apertures and hold the said bar or plate in place.

2. A nut lock, comprising a plate adapted to be supported from the bolts and provided with offsets, a bar held in the said offsets, a locking plate fitted over the said bar and held on the said offsets, and keys for holding the said locking plate in place, the said keys engaging the said offsets, substantially as shown and described.

CONRAD HAHN.

Witnesses:
JOHN BATTENFELDER,
T. E. SCHUMAKER.